(12) United States Patent
Takagi (10) Patent No.: US 7,325,985 B2
(45) Date of Patent: Feb. 5, 2008

(54) OPTICAL MODULE WITH LENS HOLDER PROJECTION-WELDED TO BUTTERFLY PACKAGE

(75) Inventor: Toshio Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/476,908

(22) Filed: Jun. 29, 2006

(65) Prior Publication Data

US 2007/0031093 A1 Feb. 8, 2007

(30) Foreign Application Priority Data

| Jul. 1, 2005 | (JP) | ............................ P2005-194152 |
| Apr. 28, 2006 | (JP) | ............................ P2006-126470 |

(51) Int. Cl.
*G02B 6/36* (2006.01)
(52) U.S. Cl. .............................. 385/94; 385/92; 385/93
(58) Field of Classification Search ............. 385/92–94
See application file for complete search history.

(56) References Cited

U.S. PATENT DOCUMENTS 5,745,625 A * 4/1998 Aikiyo et al. .................. 385/94
5,917,648 A * 6/1999 Harker ..................... 359/341.3
2004/0076384 A1* 4/2004 Kato et al. ..................... 385/92
2004/0264888 A1* 12/2004 Go ............................... 385/92
2005/0047730 A1* 3/2005 Ellison ......................... 385/92

FOREIGN PATENT DOCUMENTS

| JP | 8-316503 | 11/1996 |
| JP | 2001-060635 | 3/2001 |
| JP | 2001-156194 | 6/2001 |

* cited by examiner

*Primary Examiner*—Frank G. Font
*Assistant Examiner*—Charlie Peng
(74) *Attorney, Agent, or Firm*—Smith, Gambrell & Russell, LLP (57) ABSTRACT

An optical module capable of suppressing an increase in the number of the components and the complexity of the structure is provided. The optical module has a box package, and a cylindrical sleeve portion extending from a front wall of the package. This sleeve portion has a lens holder holding a lens. The lens holder and the front wall of the package are connected by projection-welding.

7 Claims, 10 Drawing Sheets

OPTICAL MODULE WITH LENS HOLDER PROJECTION-WELDED TO BUTTERFLY PACKAGE

BACKGROUND OF THE INVENTION

1. Technical Field

The present invention relates to an optical module with a body portion of a box shape.

2. Related Prior Art

Figure 10:
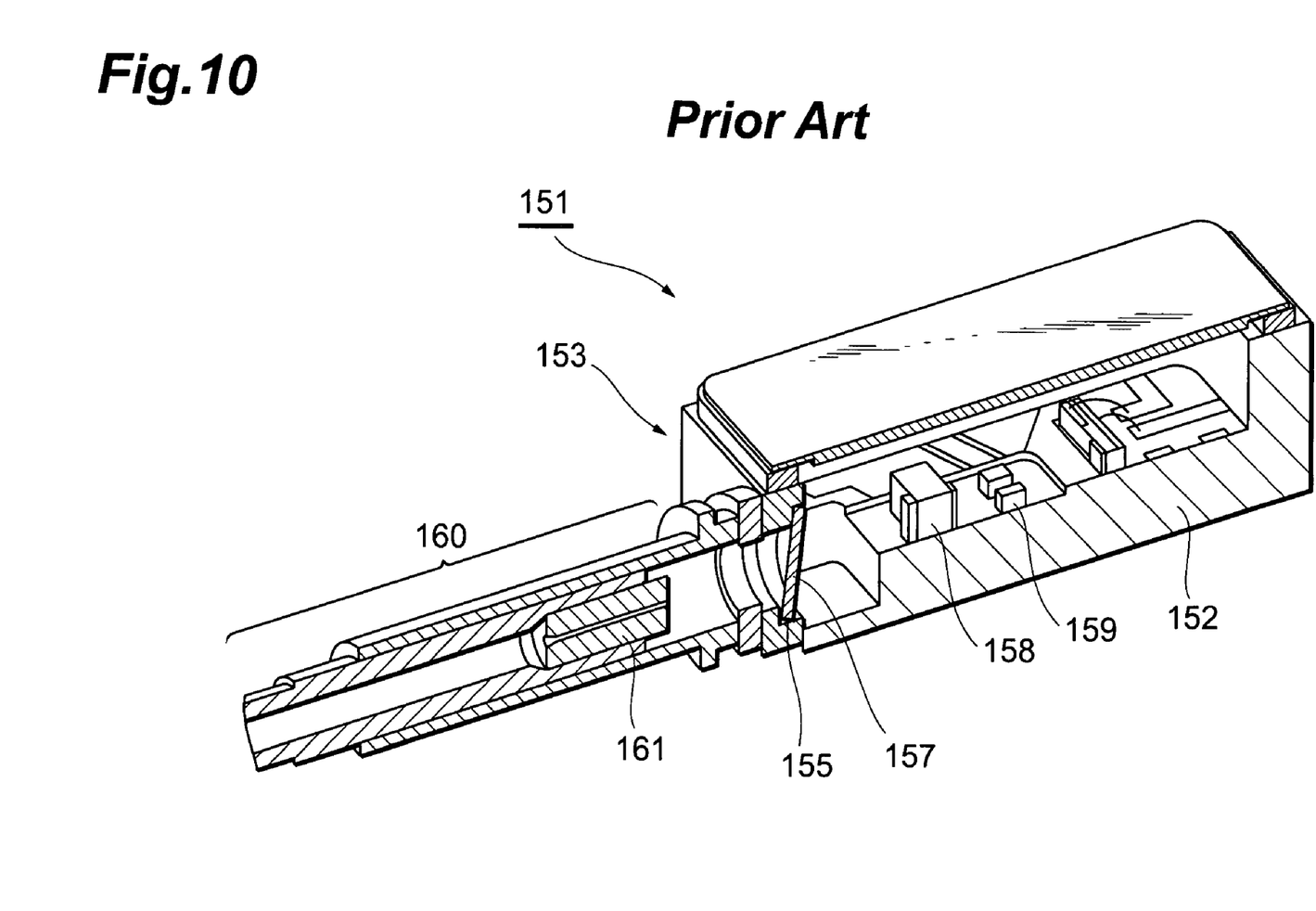
FIG. 10 is a partly broken perspective view showing a conventional optical module.

Conventionally, optical modules are known which have a butterfly-type package disclosed in Japanese Patent Application Laid-Open No. 2001-060635A, No. 2001-156194A, or No. H08-316503A. A general form of the, conventional optical module is as shown in FIG. 10, in which lead pins (not shown) extend from the left and right side walls of a box package 153 and an aperture 155 for connection with an optical alignment member, a lens, an isolator, or the like is formed in the front wall of the package. A semiconductor laser diode (denoted by LD) 159 is mounted on a base 152 inside the package, or on a thermoelectric cooler disposed on the base 152. Light emitted from the LD passes through a window 157 closing the aperture 155, to reach the optical alignment member 160, and then travels to an optical fiber (not shown) through a sleeve provided on the front end of the optical alignment member 160.

In this optical module, it is necessary to install the optically transparent member 157 such as a sapphire plate in the window 155 to transmit the light from the LD, in order for hermetic sealing of the package. For optically coupling the optical fiber with the LD 159, it is typical to arrange two lenses, a first lens 158 between the LD 159 and the window in the package, and a second lens (not shown) between the window and the optical alignment member 160 outside the package. More specifically, the first lens 158 converts the light from the LD 159 into a nearly parallel beam and thereafter the second lens focuses this parallel beam on a central region of an end surface of a stub 161 which is a part of the optical alignment member 160. Since the mounting position of the LD 159 is set apart from the end surface of the stub 161, it is forced to adopt such a 2-lens system. This configuration results in increasing the number of the components and the complexity of the structure and, in turn, raising the cost of the optical module 151.

An object of the present invention is therefore to provide an optical module able to suppress the increase in the number of the components and the complexity of the structure.

SUMMARY OF THE INVENTION

An optical module according to the present invention has, what is called, a butterfly shape having a body portion and a sleeve portion. The body portion has a space with a box shape formed by a front wall, a rear wall, and a pair of side walls connecting these front and rear walls, and an optical element such as a semiconductor laser diode is mounted in this space. The front wall is provided with an aperture through which an optical axis connecting the optical element with an optical fiber coupled to this optical module passes. The sleeve portion optically couples the optical fiber to the optical element mounted in the body portion. That is, the sleeve portion has a cylindrical lens holder for holding a lens, and the lens holder is fixed by projection-welding to the front wall of the body portion so that the lens is located on the optical axis.

Since the body portion and the lens holder are projection-welded, it is unnecessary to arrange a 2-lens system which is inevitable for conventional packages of this type, and the single lens held by the lens holder is enough to optically couple the optical element to the optical fiber. The lens is fixed to the lens holder so as to seal the space of the body portion in hermetic, and thus it is unnecessary to arrange the window material for closing the aperture of the front wall, which is necessary in the prior art.

The lens holder preferably has a shape including a front cylinder, a rear cylinder, and a flange configured between the front and rear cylinders. The rear cylinder may be inserted into the aperture of the front wall of the body portion, and the rear surface of the flange may be projection-welded to the front surface of the body portion. For the welding, a projection with a triangular cross section is formed on the rear surface of the flange of the lens holder or on the front wall of the body portion, and a huge electric current is applied between the lens holder and the body portion to melt the projection while a stress is applied to both the components, thereby carrying out the projection-welding.

Each of the side walls of the body portion may have a groove extending in a direction intersecting the optical axis, in an outer surface of the side wall. Electrodes of a projection welder are supported in the grooves, whereby the stress applied during the welding can be received.

The front wall of the body portion may provide a cylinder portion forwardly projecting so as to surround the aperture, a flange may be provided on the front end of the cylinder portion, and the lens holder may be projection-welded to the flange. The stress applied during the welding can be received by putting electrodes of a welder into a gap formed by the flange.

DESCRIPTION OF THE PREFERRED EMBODIMENTS

A preferred embodiment of the optical module according to the present invention will be described below in detail with reference to the drawings.

Figure 1:
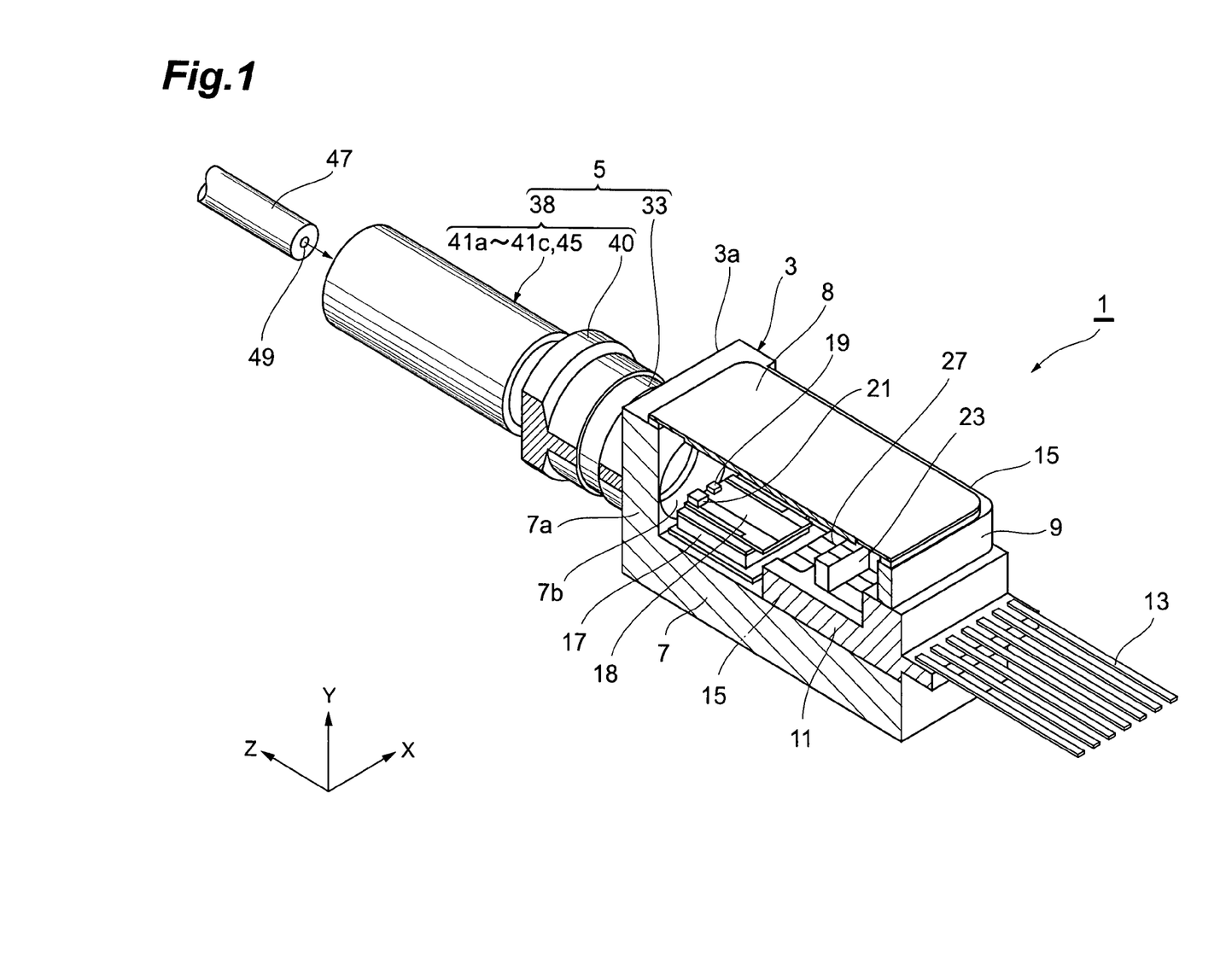
FIG. 1 is a partly broken perspective view showing an optical transmitting module according to an embodiment of the optical module of the present invention.
Figure 2:
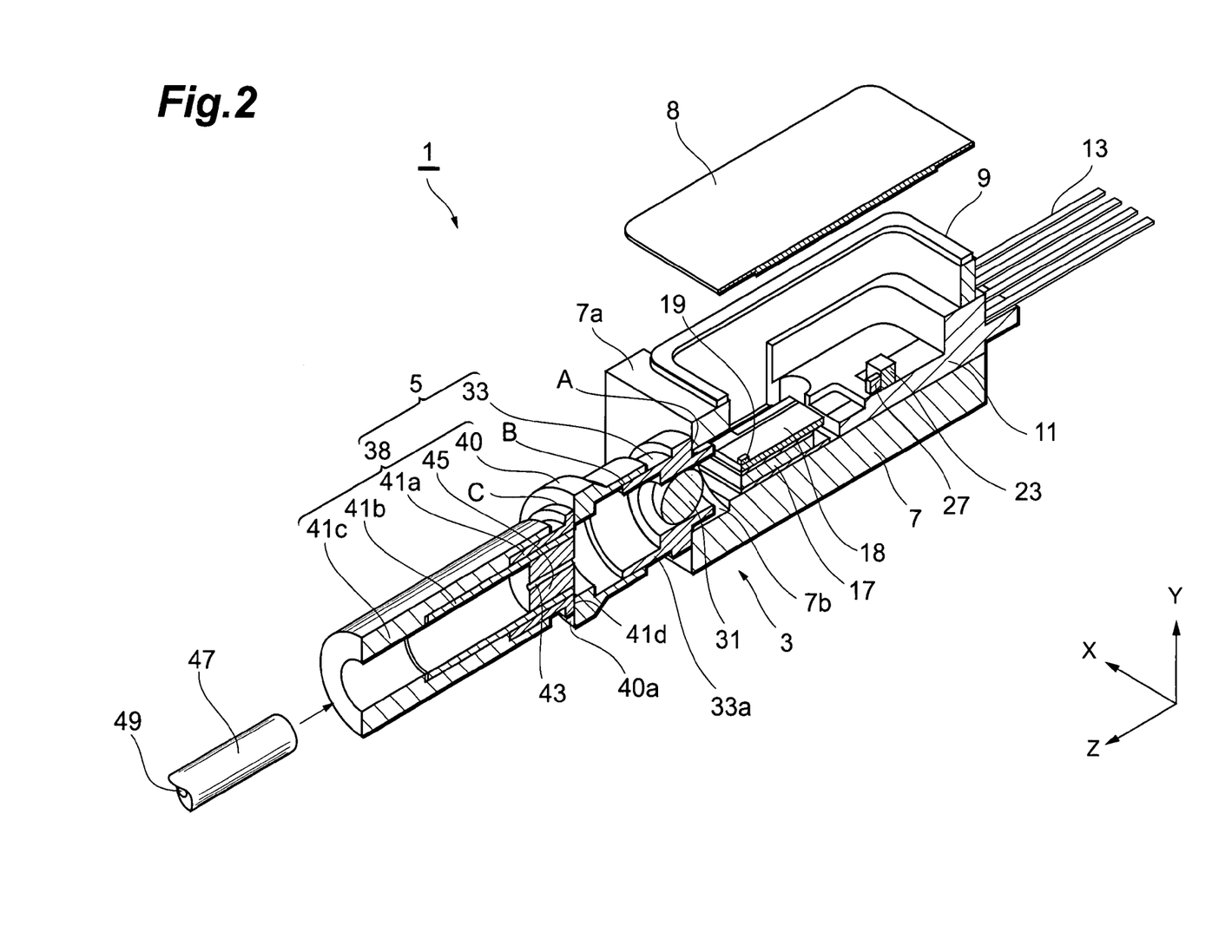
FIG. 2 is another partly broken perspective view showing the optical transmitting module in FIG. 1.

As shown in FIGS. 1 and 2, an optical transmitting module (optical module) 1 is configured of a body portion 3 with a box shape which is substantially rectangular, and a cylindrical sleeve portion 5 extending forward from the front wall (one of the side surfaces) 7a of this body portion 3. The body portion 3 includes a metal base 7, and one of the sides of this base 7, the front side, stands up to form the front wall 7a. The body portion 3 further includes a ceiling 8. The XYZ axes are defined as follows and will be used in the description hereinafter: the Y-direction is taken along an upward direction in a state shown in FIG. 1, the Z-direction along a direction where the sleeve portion 5 extends, and X-direction along a direction perpendicular to both the Y-direction and the Z-direction.

In the body portion 3, a ceramic substrate 11 is fixed to a rear wall 9 opposite to the front wall 7a, so as to penetrate this rear wall 9. The rear end of the ceramic substrate 11 projects outward from the rear wall 9 and a plurality of lead pins 13 extend backward from a wiring surface on the projecting portion. Although this optical module 1 has the form in which the lead pins project from only the rear wall 9, it is possible to configure ceramic substrates to be disposed in three walls, that is, the rear wall 9 and the side walls 15 perpendicular to the rear wall 9, and lead pins to be extended from each of the three walls. In this configuration, it is necessary for the lead pins extending from the two side walls 15 not to come in contact to a lower electrode 39 (see FIG. 5) for the projection-welding.

On the front side of the body portion 3, a Peltier device 17 is mounted on the base 7, and a wiring substrate 18 with a wiring pattern thereon is mounted on the upper plate of the Peltier device 17. Furthermore, a laser diode (LD) 19 and a thermistor 21 are mounted on the wiring substrate 18. On the other hand, on the rear side of the body portion 3, a photodiode (PD) 27 for detecting backward light from the LD 19 is mounted on the top of the ceramic substrate 11 with a chip carrier 23 therebetween. A driver IC for driving the LD 19 may be mounted between the PD 27 and the LD 19.

The cylindrical sleeve portion 5 extending forward from the front wall 7a of the body portion 3 has a lens holder 33 for holding a lens 31, and a sleeve assembly 38 coupled to a front cylinder 33a of the lens holder 33. This sleeve assembly 38 is configured of a J-sleeve (hereinafter referred to as "J-sleeve") 40 fitted to the outer periphery of the front cylinder 33a, and of a bush 41a, a sleeve 41b, a sleeve cover 41c, and a stub 45 which are connected to the front of the J-sleeve 40. The sleeve assembly 38 holds a ferrule 47 to be inserted into the assembly from the front. The stub 45 is held inside the rear end of the sleeve 41b, and holds a coupling fiber 43 in the center thereof.

The optical ferrule 47 holding an optical fiber 49 to be coupled to this light transmitting module 1 is inserted from the front of the sleeve 41b, and the leading end of the ferrule 47 comes to abut on the stub 45. Then physical contact is established between the end surfaces of the optical fiber 49 held in the center of the ferrule 47 and the coupling fiber 43 held in the center of the stub 45, whereby the light emitted from the LD 19 is focused on the end surface of the coupling fiber 43 by the lens 31, is guided through this coupling fiber 43 to the optical fiber 49, and then propagates in the optical fiber 49.

Figure 3:
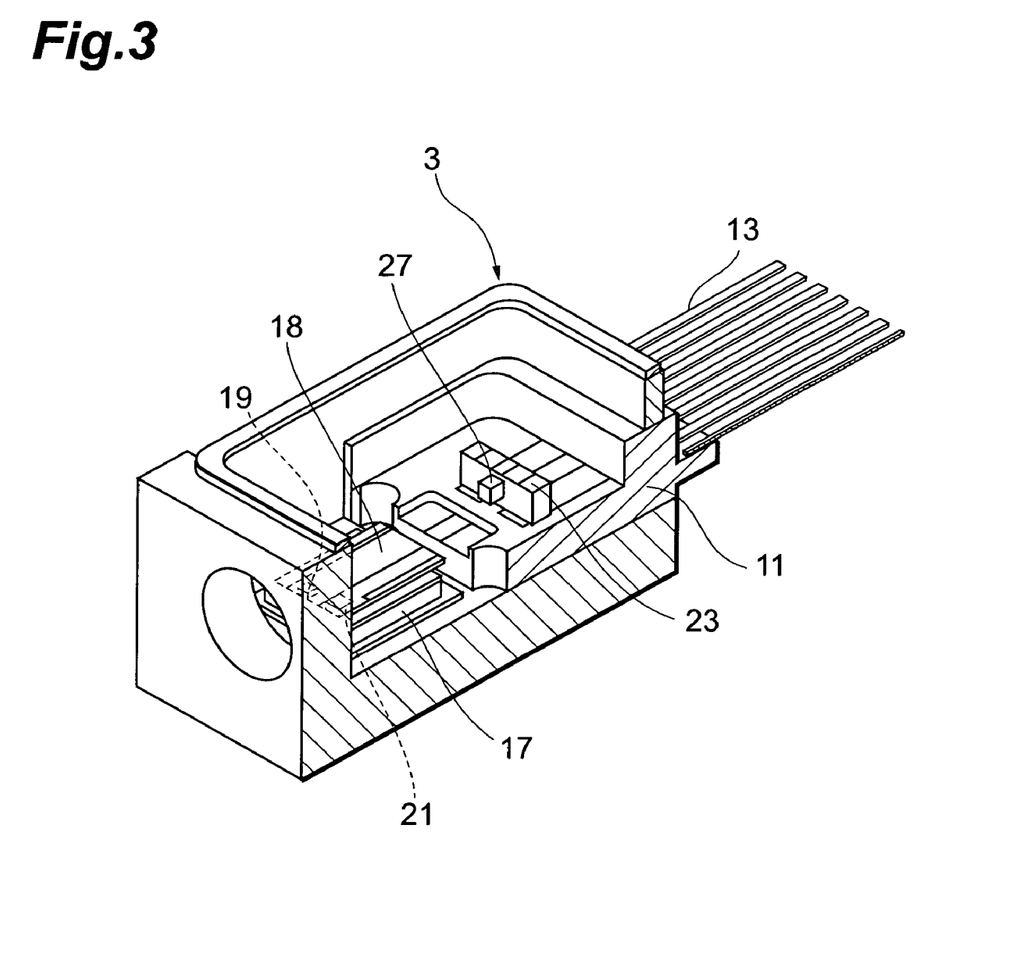
FIG. 3 is a partly broken perspective view showing a body portion of the optical transmitting module in FIG. 1.

A process of assembling the light transmitting module 1 will now be described. First, as shown in FIG. 3, the Peltier device 17, the wiring substrate 18, the LD 19, the chip carrier 23, the PD 27, and the thermistor 21 are fixed inside the body portion 3, and the wire bonding is performed at necessary locations. The base 7 is primarily made of Kovar, and an aperture 7b is formed in the front wall 7a of the base. The aforementioned ceramic substrate 11 mounting the chip carrier 23 and connecting the lead pins 13 to the LD 19 is preliminarily formed as a portion of the side wall of the body portion 3.

Figure 4:
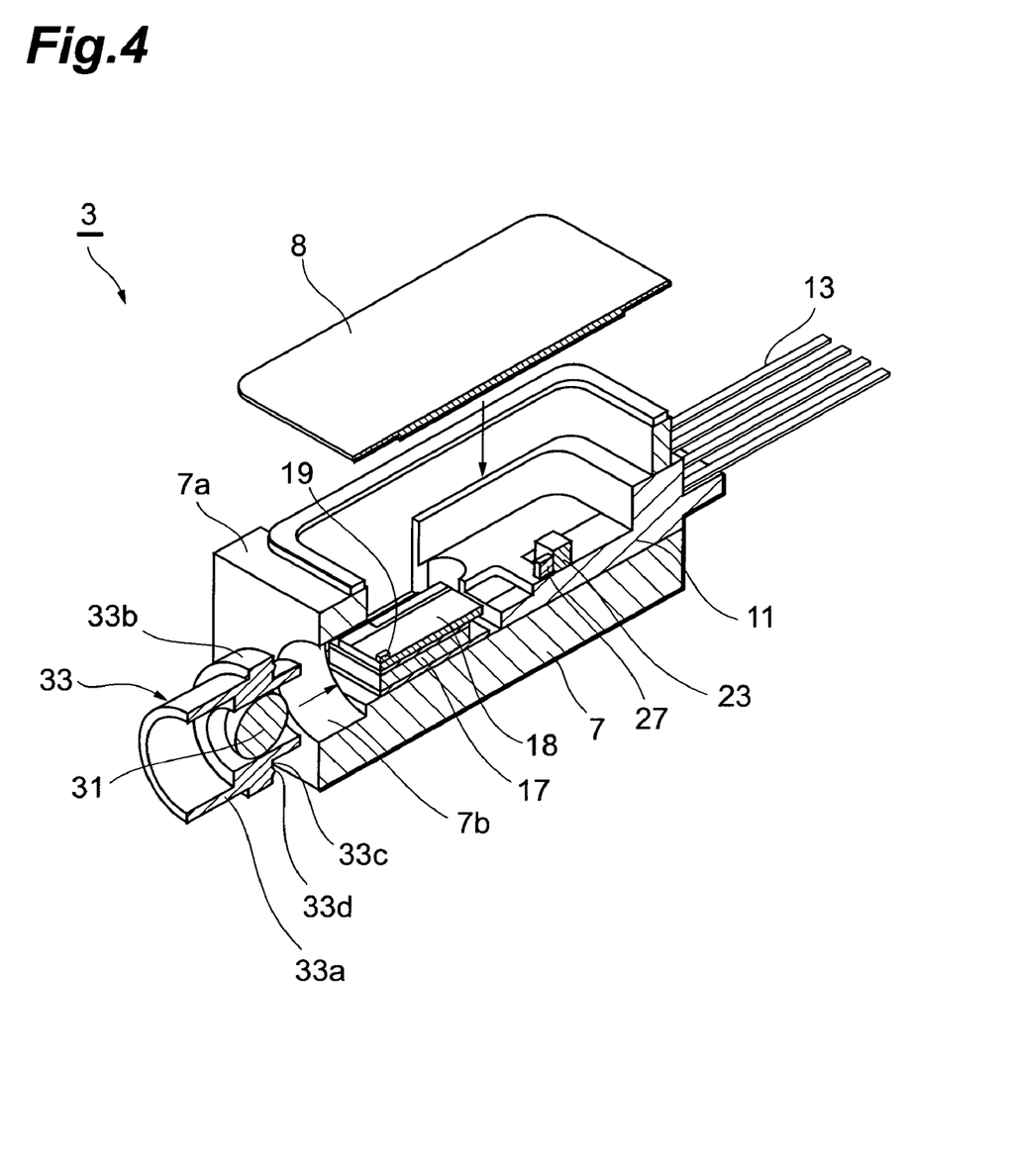
FIG. 4 is a partly broken perspective view showing the body portion and the lens holder of the optical transmitting module in FIG. 1.

Next, as shown in FIG. 4, the lens holder 33 that holds the lens 31 is inserted into the aperture 7b of the front wall 7a. While the LD 19 is activated, or while the light-emitting surface of the LD 19 is observed with a camera or the like, the rear surface 33c of a flange 33b of the lens holder 33 is slid on the front surface of the front wall 7a to align the lens 31 with the LD 19 within the XY plane, and the lens holder 33 is fixed to the front wall 7a of the base 7 by projection-welding (resistance-welding) described later.

Conventionally, the resistance-welding has not been commonly applied to a box package like the body portion 3. This is because that the resistance-welding requires special electrodes for a welder. Thus, in the prior art, with respect to the box package with the aperture 7b, the first lens is mounted inside the body portion 3, the second lens is mounted outside the body portion 3, and these first and second lenses are aligned with each other to optically couple the LD to the coupling fiber. On the other hand, with respect to the light transmitting module 1 of the present embodiment, the lens holder 33 is fixed to the body portion 3 by the projection-welding, and thus the interior of the body portion 3 is hermetically sealed by the lens 31 which also serves as a window material. Then, the ceiling 8 is attached to the base 7 by seam-sealing to seal the interior of the body portion 3 in an airtight manner.

Referring again to FIG. 2, the J-sleeve 40 is slid in the Z-direction (the optical axis direction) toward the lens holder 33, and an end surface 40a of the J-sleeve 40 and an end surface 41d of the bush 41a are slid in the XY directions to adjust the XYZ position of the sleeve 41b so that the optical power emitted from the optical fiber 49 in the sleeve 41b becomes a predetermined magnitude. After the alignment, the lens holder 33 and the J-sleeve 40 are fixed together at a point B by the YAG welding, and the bush 41a and the J-sleeve 40 are fixed together at a point C by the YAG welding. The YAG welding enables a quick bonding at the points B and C, and suppresses the deviation in the alignment due to the thermal expansion because the YAG welding requires a smaller heat applied on the components than the bonding using a thermosetting adhesive. The light transmitting module 1 is completed in this way.

The aforementioned projection-welding between the lens holder 33 and the body portion 3 will be described below in further detail with reference to FIGS. 5 to 7.

The projection-welding is a technique in which a protrusion (projection) with a triangular cross section is formed on a welded surface of a component, another component is come in contact to the component at a very narrow region, that is, at the tip of the projection, a large electric current is instantaneously applied to the contact, and this electric current is concentrated at the narrow contact to melt the projection while both the components are pressed, thereby fixing these components together. In application to optical components such as the light transmitting module 1, the electric current as large as 2-10 kA is typically applied.

Figure 5:
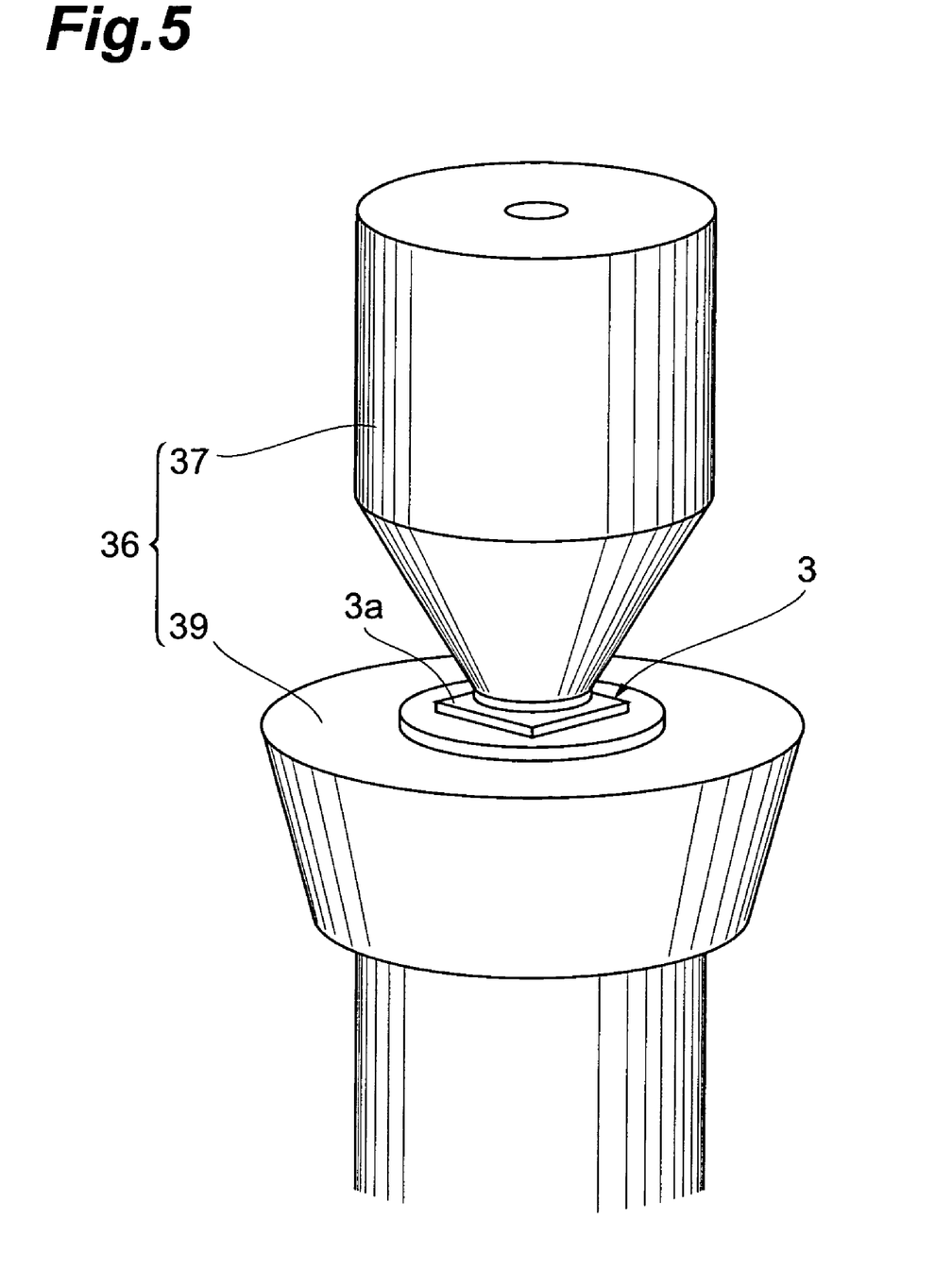
FIG. 5 is a perspective view showing an area near upper and lower electrodes of a resistance welder with the body portion and the lens holder being set.
Figure 6:
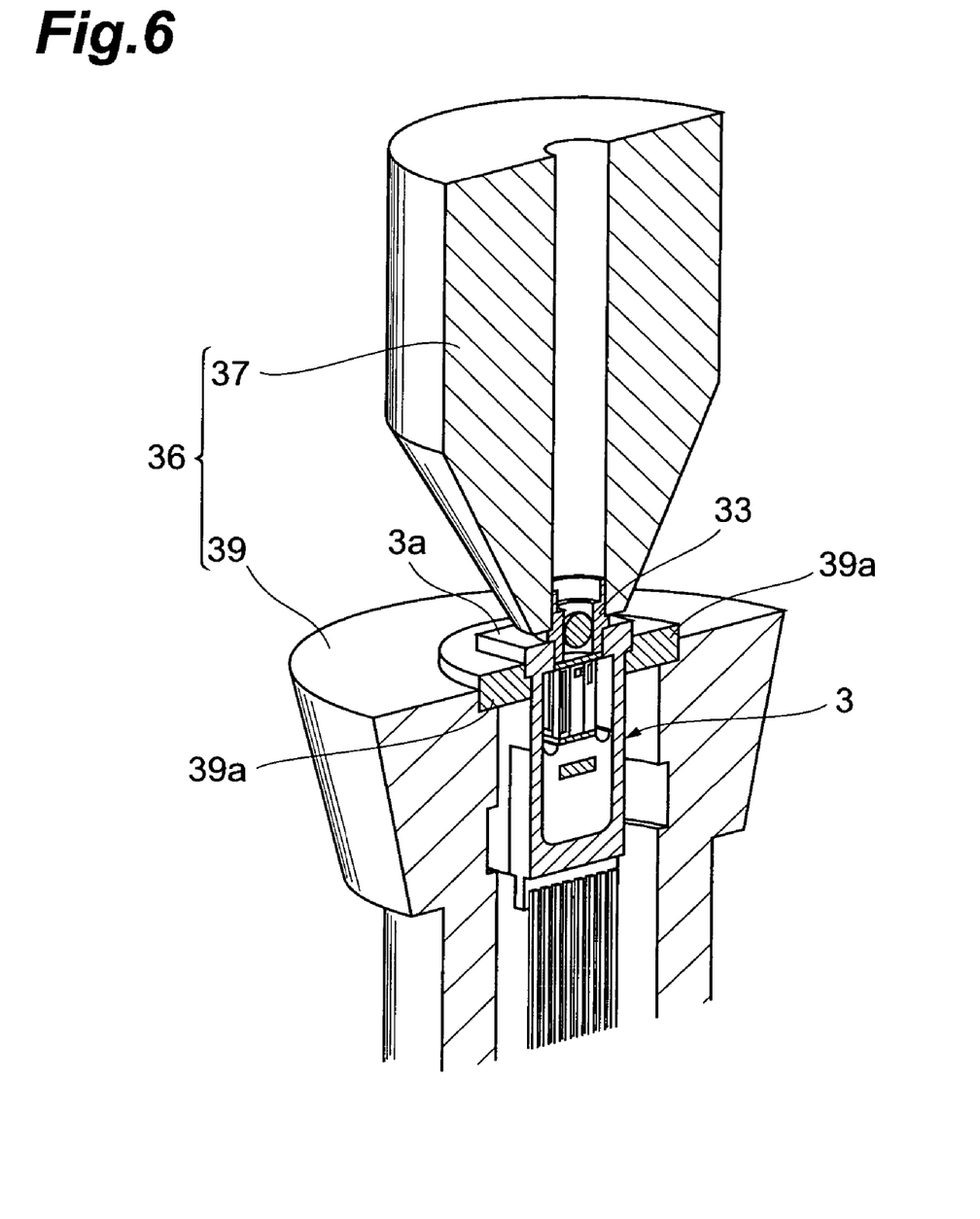
FIG. 6 is a longitudinal sectional perspective view showing the resistance welder in FIG. 5.
Figure 7:
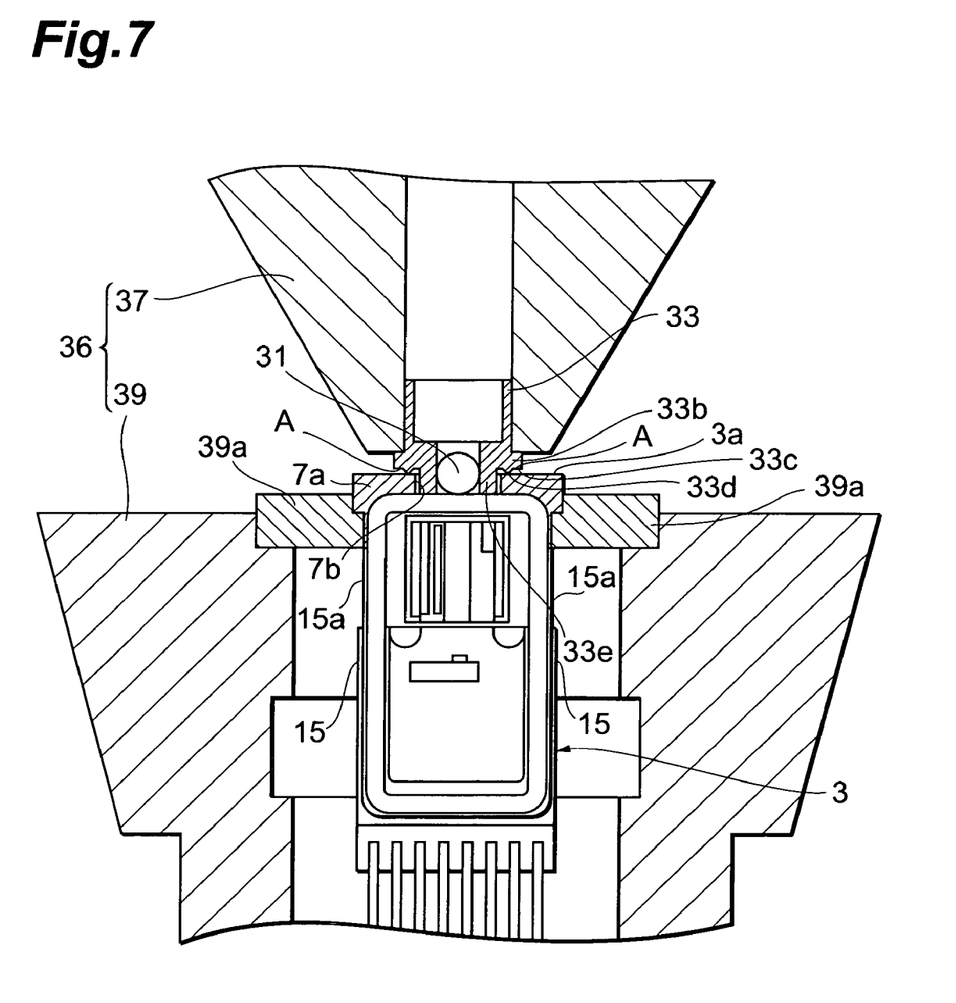
FIG. 7 is a longitudinal sectional view showing the resistance welder in FIG. 5.

As shown in FIGS. 5 to 7, the front surface 3a of the body portion 3 is projection-welded to the rear surface 33c of the flange 33b of the lens holder 33. A projection 33d which has a triangular cross section and extends throughout the entire periphery of the flange 33b is formed in advance on the rear surface 33c of the flange 33b. When the rear cylinder 33e of the lens holder 33 is inserted into the aperture 7b, the tip of the projection 33d of the lens holder 33 comes into contact with the front surface 3a of the body portion 3. In this state, the body portion 3 and the lens holder 33 are set in a resistance welder 36, and a large electric current is applied between an upper electrode 37 and a lower electrode 39 while pressing the lens holder 33 against the body portion 3 by applying a pressure to an upper electrode 37 and a lower electrode 39. This electric current flows through the tip of the projection 33d to melt the projection 33d, whereby the rear surface 33c of the lens holder comes to be welded to the front surface 3a of the body portion 3.

Referring to FIG. 7, it is preferable in the projection-welding that the contact between the lower electrode 39 and the body portion 3 is as close to the welded portion A as possible, in order to prevent the large current in the welding from flowing through portions not related to the welding and from breaking the body portion 3 and the components mounted therein. The large current flowing from the upper electrode 37 immediately flows through the welded portion A to the lower electrode 39, without flowing to the interior of the body portion 3, so as to prevent the components inside the body portion 3 from being broken.

Figure 8:
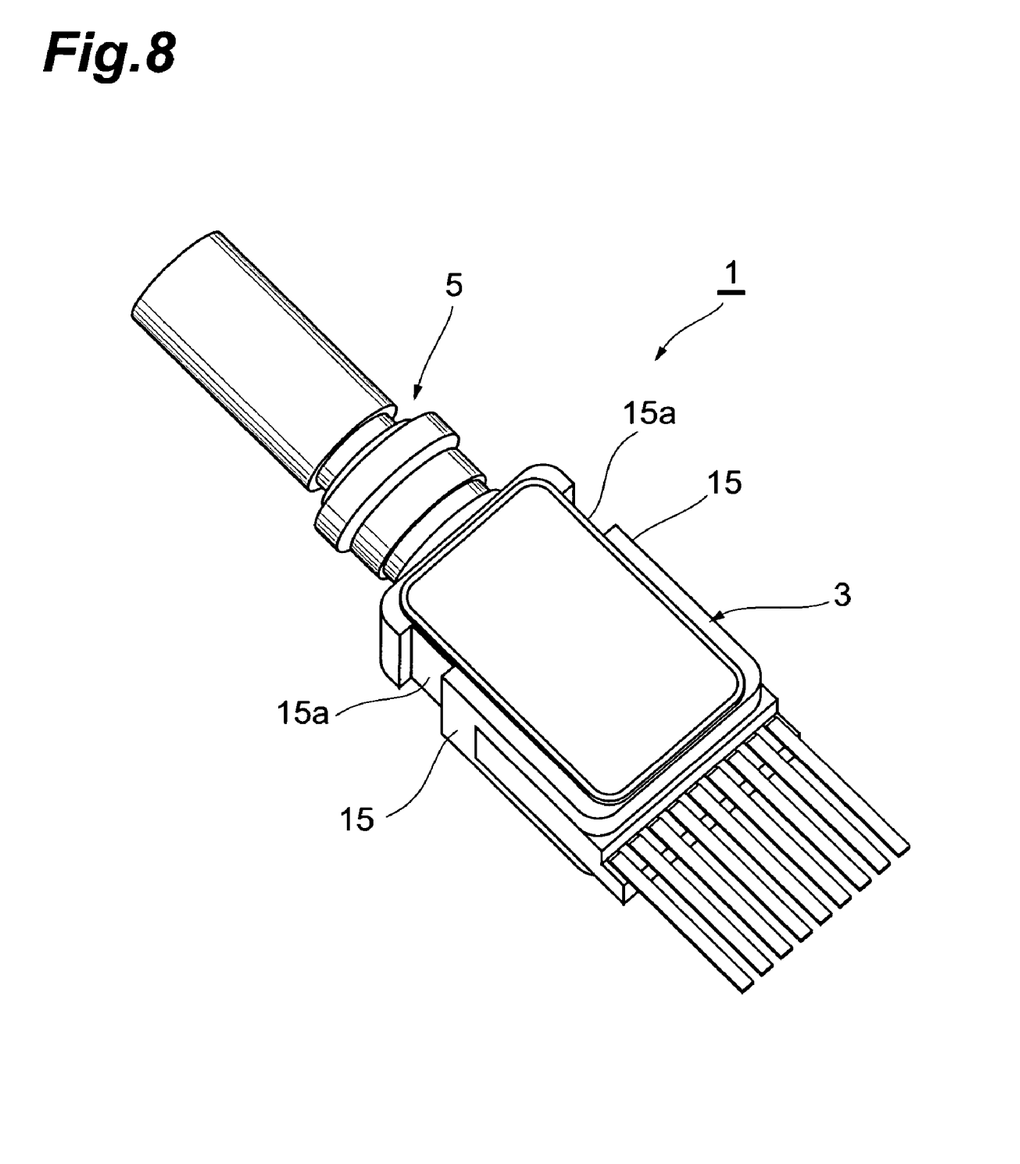
FIG. 8 is a perspective view showing the appearance of the optical transmitting module in FIG. 1.

For this reason, in the optical module 1, a groove 15a extending in the Y-direction parallel to the front wall 7a is formed in each side wall 15 of the body portion 3 as shown in FIGS. 7 and 8. An adaptor 39a for holding the body portion 3 on the opposite sides thereof is attached to the lower electrode 39, and this adaptor 39a is inserted into the grooves 15a to fix the body portion 3 to the lower electrode 39. Since the light transmitting module 1 has such grooves 15a, the module can bear the pressure in the Z-directional by the electrodes 37 and 39 during the projection-welding.

Since the use of the adaptor 39a makes the contact between the lower electrode 39 and the body portion 3 closer to the welded portion A, the large current flowing from the upper electrode 37 immediately flows through the welded portion A to the adaptor 39a of the lower electrode 39, without flowing to the interior of the body portion 3. It is thus able to prevent the large current from flowing to the portions not related to the welding and to prevent the components mounted inside the body portion 3 from the breakage.

Figure 9:
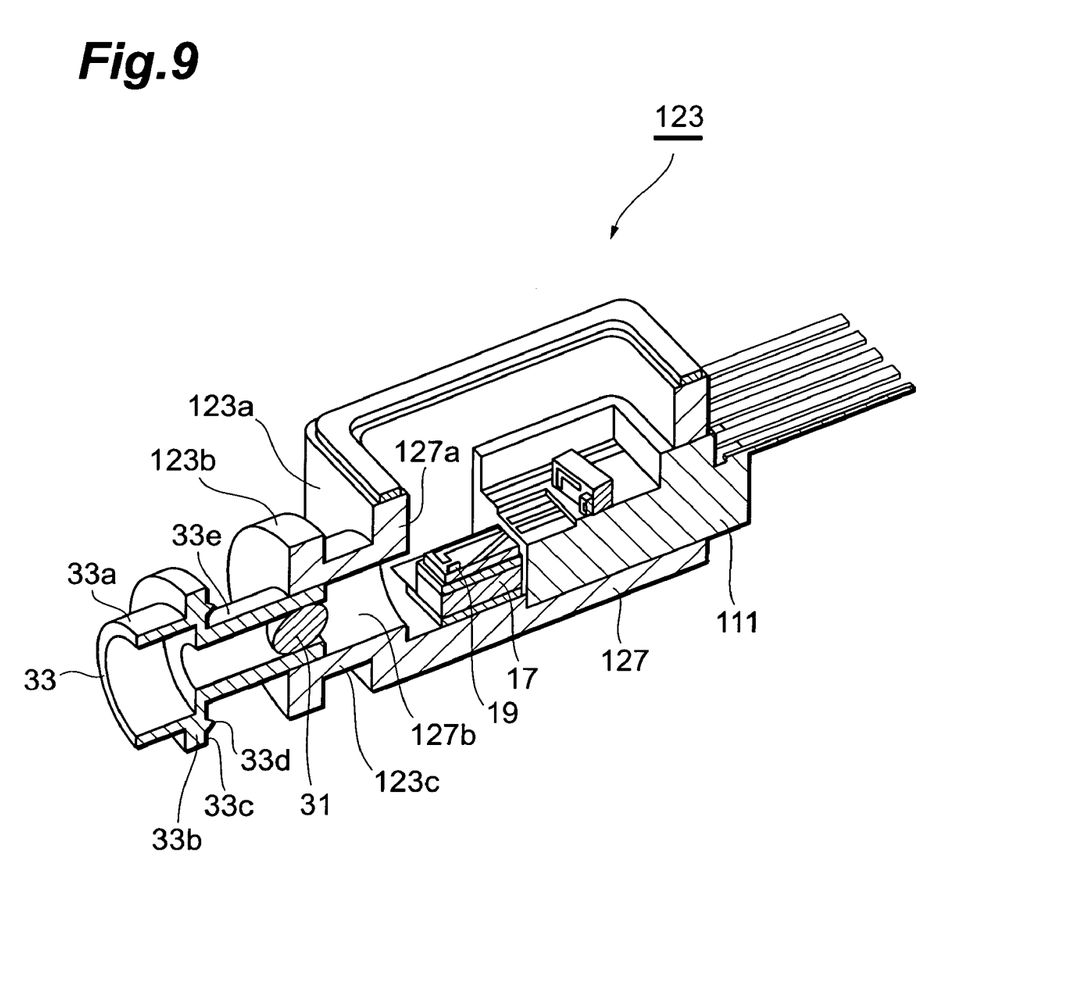
FIG. 9 is a partly broken perspective view showing another embodiment of the optical transmitting module according to the present invention.

FIG. 9 shows another example of the body portion to receive the pressure from the two electrodes. The body portion 123 of the module shown in FIG. 9 is different from the body portion 3 shown in FIG. 3 or 4 in the structure associated with a front wall 127a of a base 127. That is, in the base 127 of the present example, a cylinder portion 123c extending forward from the front surface 123a so as to surround an aperture 127b formed in the front wall 127a, and a flange 123b is provided on the front end of the cylinder portion. The rear cylinder 33e of the lens holder 33 is inserted into the flange 123b, and into the aperture 127b of the cylinder portion 123c, and the projection formed on the rear surface 33c of the flange 33b of the lens holder 33 is projection-welded to the front surface of the flange 123b. Upon the welding, the body portion 123 is fixed by holding the cylinder portion 123c of the body portion 123 using an adaptor and attaching the adaptor to the lower electrode 39 of the resistance welder 36. The adaptor is located apart from the front surface 123a of the body portion 123. Since the adaptor receives the pressure from the two electrodes, the pressure is not applied to the body portion 123.

Since components such as the lens 31 exist in proximity to the portion through which the large current passes during the projection-welding, it is necessary to pay a special attention to the shape of the electrodes for the projection-welding, in order to prevent these components from the breakdown by the large current. The resistance welder 36 used in the foregoing projection-welding prevents the breakage of the components such as the lens 31, particularly by adopting the lower electrode 39 with a special shape and a special component (adaptor 39a or flange 123b).

FIG. 10 shows an optical module 151 having a conventional butterfly package. In this optical module 151, the window material 157 made of an optical glass or sapphire plate had to be attached to the aperture 155 in the front surface of the body portion 153, in order to transmit light and hermetically seal the interior of the body portion 153. To apply such a window material 157 is a factor to impede the reduction of the cost of the optical module with the conventional butterfly package. In particular, to use the window material 157 of the sapphire plate prevents the cost reduction.

Furthermore, for the window material 157, it is necessary to take the 2-lens system in which two lenses were disposed inside and outside the body portion 153, respectively, in order to optically couple the coupling fiber to the LD. It is unavoidable to increase the number of the components and to use the complex structure for the optical module, and therefore directly results in a rise of the module cost. When the foregoing 2-lens system is used, it is necessary to increase the section of the aperture 155 and also to increase the size of the window material 157. As described above, sapphire itself as an optimal material for the window material 157 is expensive, and there is little room for the reduction of the size, which resulted in an increase of the cost of the optical module 151 having the butterfly package.

In contrast, in the above-described optical module 1 (see FIG. 2), the lens holder 33 with the lens 31 is bonded to the front wall 7a by the resistance-welding so as to hermetically seal the interior of the body portion 3, which enables the interior of the body portion 3 to be hermetically sealed by the lens 31 in the lens holder 33. Thus it is unnecessary to add the window material 157, and therefore it is possible to avoid an increase in the number of the components and the complexity of the structure. Furthermore, since the window material 157 as described above is unnecessary, the lens 31 can be positioned closer to the aperture 7b, and the desired optical coupling between the LD 19 and coupling fiber 43 can be achieved even by one lens. It is unnecessary to increase the number of lenses for the optical coupling.

In the light transmitting module 1 in accordance with the present invention (see FIG. 2), the lens 31 is aligned with the LD 19 after the LD 19 is mounted in the body portion 3. Therefore, the relative positional accuracy can be enhanced between the LD 19 and the lens 31, and it becomes possible to use the lens 31 that provides the coupling efficiency largely affected by positional deviation. In addition, the deviation also becomes smaller in the relative positions of the LD 19 and the lens 31. For this reason, the variation also becomes smaller in the optical coupling efficiency between the LD 19 and the coupling fiber 43 and, furthermore, the positional deviation can also be made smaller between the coupling fiber 43 and the body portion 3.

What is claimed is:

1. An optical module for installing an optical element and for providing an optical coupling between an optical fiber and the optical element, comprising:
   a body portion installing the optical element and including a space, an optical axis and an aperture, the space being shaped in a box and defined by a front wall, a rear wall, and a pair of side walls connecting the front wall to the rear wall, the optical axis extending from the optical element to the optical fiber passing through the aperture provided in the front wall; and a cylindrical sleeve portion extending from the front wall and configured to receive the optical fiber therein, the cylindrical sleeve portion including a lens holder for holding a lens, the lens holder being fixed to the front wall by projection-welding such that the lens is located on the optical axis, wherein each of the pair of side walls provides a groove in a direction intersecting with the optical axis.

2. An optical module according to claim 1, wherein the lens holder has a front cylinder, a rear cylinder, and a flange arranged between the front cylinder and the rear cylinder, the lens being held in an inner hole of the rear cylinder, the rear cylinder being inserted into the aperture in the front wall, and the flange having a rear surface projection-welded to the front wall.

3. An optical module according to claim 2, wherein the lens seals the space in an airtight manner.

4. An optical module according to claim 1, wherein the front wall has a cylinder portion surrounding the aperture and projecting forward, and a flange provided on a front end of the cylinder portion, and wherein the lens holder is projection-welded to the flange.

5. An optical module according to claim 4, wherein the lens holder has a front cylinder, a rear cylinder, and a flange arranged between the front cylinder and the rear cylinder, the lens being held in an inner hole of the rear cylinder, the rear cylinder being inserted into the aperture, and a front surface of the flange of the front wall being projection-welded to a rear surface of the flange of the lens holder.

6. An optical module according to claim 4, wherein the lens seals the space in an airtight manner.

7. An optical module according to claim 1, where in the sleeve portion further includes a sleeve assembly including, the sleeve assembly comprising:

a joint sleeve having an inner hole for receiving a front cylinder of the lens holder, the joint sleeve further having a front end surface, columnar stub including a coupling fiber in a central region thereof, a sleeve for receiving a ferrule attached to the optical fiber, a sleeve cover for covering the sleeve, and a bush having a flat rear end surface, the bush being fit into a space between the stub and the sleeve cover to caulk the stub together with the sleeve, the optical element being aligned with the optical fiber in a direction parallel to the optical axis by sliding the joint sleeve on an outer periphery of the front cylinder of the lens holder, and the optical element being aligned with the optical fiber in two directions normal to the optical axis by sliding the stub and the rear end surface of the bush on the front end surface of the joint sleeve.

* * * * *